Sept. 27, 1955 M. GRAVINA 2,718,797
TRANSMISSION DEVICES FOR MOTOR VEHICLES
Filed May 11, 1951 4 Sheets-Sheet 1
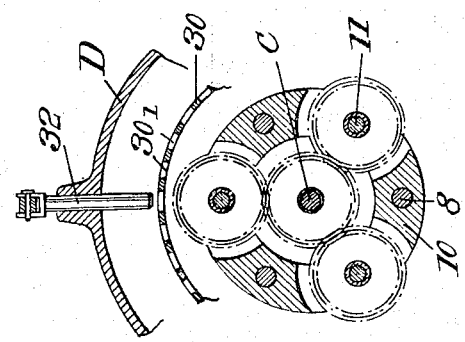
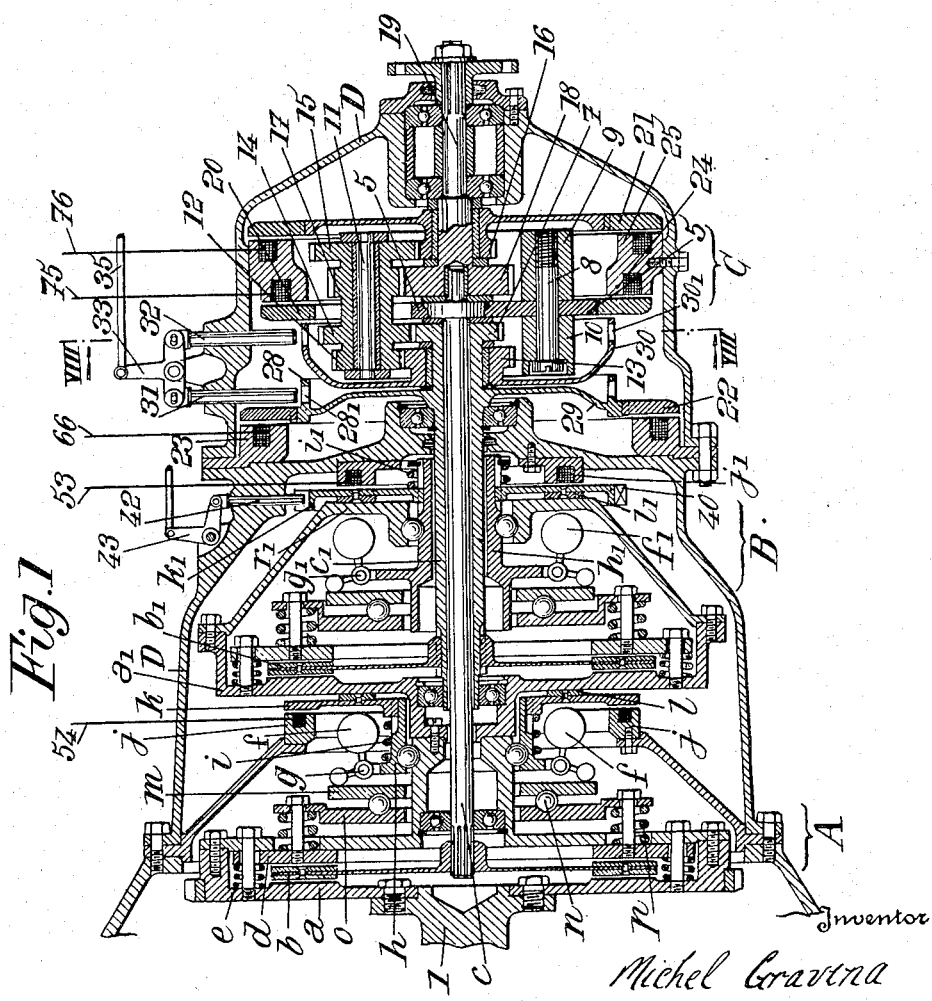
Inventor
Michel Gravina
By Bailey, Stephens and Huettig
Attorneys Sept. 27, 1955                M. GRAVINA                  2,718,797
                TRANSMISSION DEVICES FOR MOTOR VEHICLES
Filed May 11, 1951                                    4 Sheets-Sheet 2

INVENTOR
Michel Gravina
BY
Bailey, Stephens and Huettig
ATTORNEYS

Sept. 27, 1955  M. GRAVINA  2,718,797
TRANSMISSION DEVICES FOR MOTOR VEHICLES
Filed May 11, 1951  4 Sheets-Sheet 3
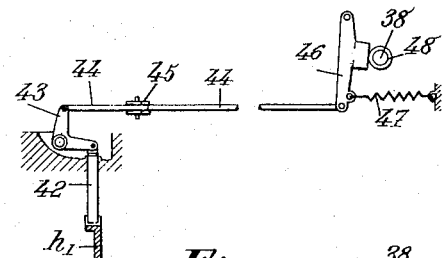
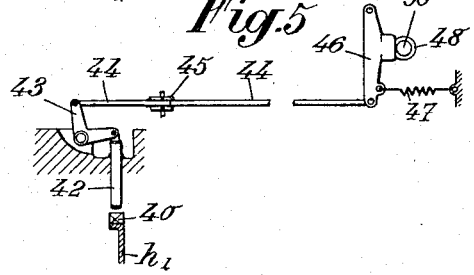
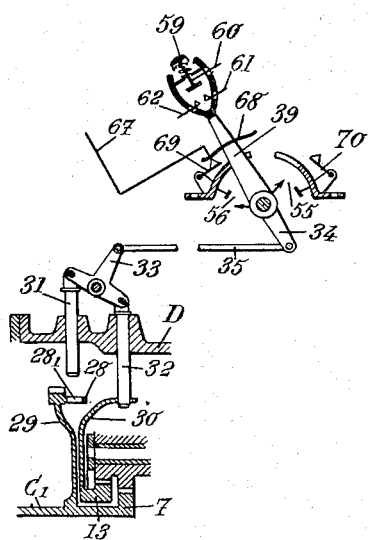
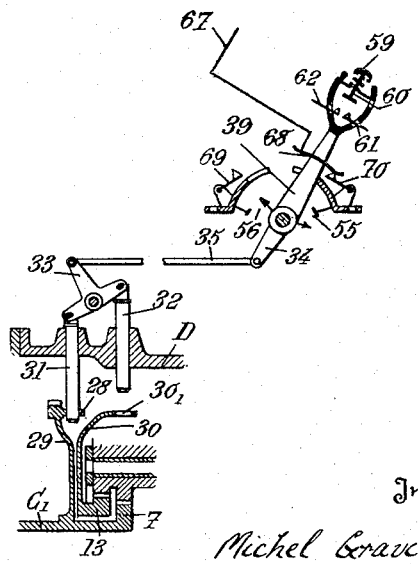
Inventor
Michel Gravina
By Bailey Stephens and Huettig
Attorneys Sept. 27, 1955    M. GRAVINA    2,718,797
TRANSMISSION DEVICES FOR MOTOR VEHICLES
Filed May 11, 1951    4 Sheets-Sheet 4
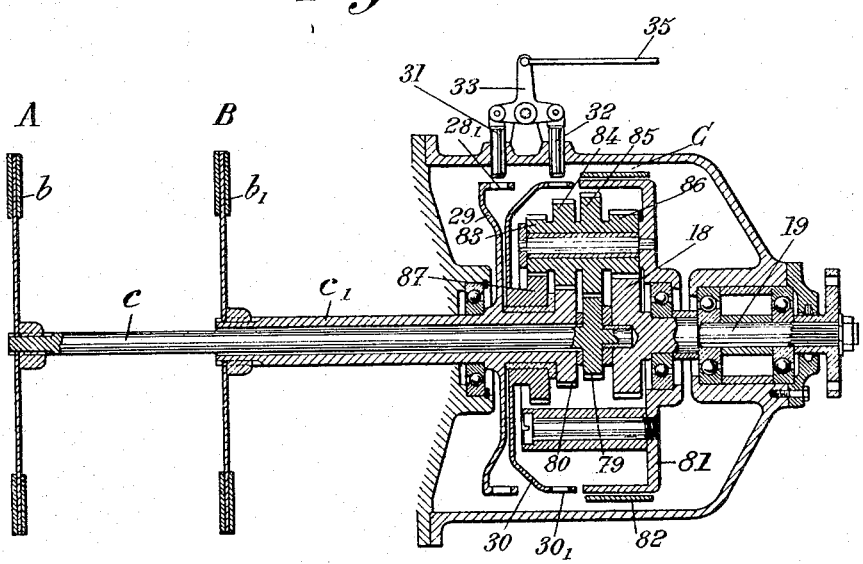
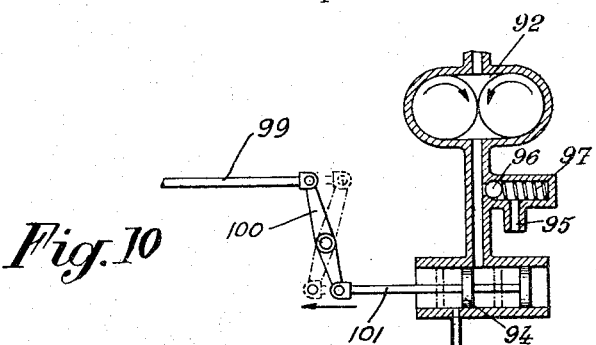
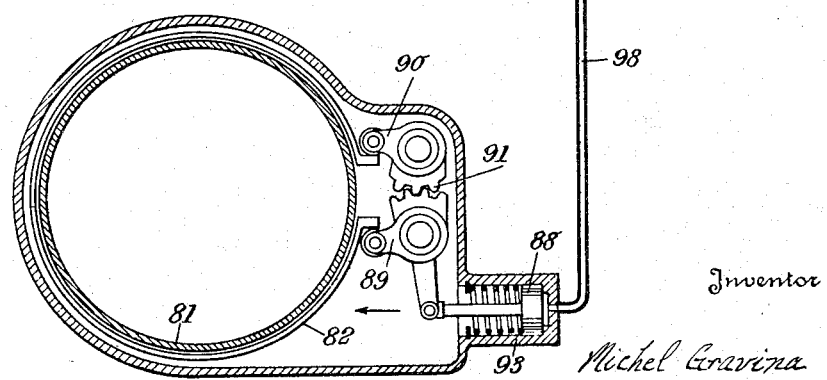
Inventor
Michel Gravina
By Bailey, Stephens and Huettig
Attorneys United States Patent Office 2,718,797
Patented Sept. 27, 1955

2,718,797
TRANSMISSION DEVICES FOR MOTOR VEHICLES
Michel Gravina, Paris, France
Application May 11, 1951, Serial No. 225,888
Claims priority, application France May 17, 1950
5 Claims. (Cl. 74—752)

The present invention relates to transmission devices including a sun and planet wheel change speed gear, and it is more especially intended for use on a motor vehicle.

Its chief object is to provide a device of this kind which is better adapted to meet the requirements of practice than those used up to the present time.

For this purpose, according to my invention, the sun and planet wheel gear has three main elements mounted coaxially about the central axis of said gear and two of which are rigid with the driven shafts of two centrifugal clutches the driving elements of which are coupled permanently with the driving shaft of the transmission, and control means are provided for engaging at will either of these clutches or both of them simultaneously.

Other features of my invention will become apparent in the course of the following description of embodiments thereof, given merely by way of example, with reference to the appended drawings, in which:

Fig. 1 is an axial sectional view of a transmission device made according to an embodiment of my invention;

Figure 2:
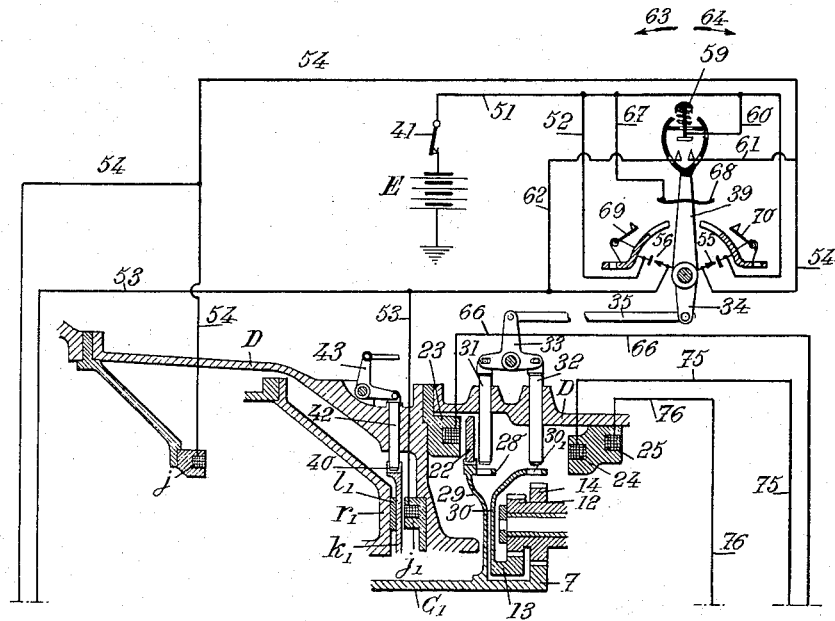
Figs. 2 and 3 are an elevational view and a plan view, respectively, diagrammatically showing the mechanical and electrical connections between elements of this device.

Figs. 4 and 5 diagrammatically show a portion of the mechanical elements of this device, in two different positions respectively;

Figs. 6 and 7 show the control lever of the transmission device and a portion of the mechanical elements cooperating therewith, in two different positions of operation;

Fig. 8 is a section on the line VIII—VIII of Fig. 1;

Fig. 9 is a view similar to Fig. 1 of another embodiment of my device;

Fig. 10 is a diagrammatic view of a hydraulic brake control to be used with my device.

Referring more especially to Fig. 1, the transmission includes two clutches A and B of the centrifugal control type and a sun and planet gear C (or an epicycloidal gear) two main elements of which, for instance the planet wheel carrier and one of the sun wheels, are connected respectively to clutch A and to clutch B, which are themselves driven from driving shaft 1.

The centrifugal control clutches may be of any suitable construction. For instance, the first clutch, A, includes a rotary casing $a$ coupled in rotation with driving shaft 1. Inside this casing is located a disc $b$ rigid with the driven shaft $c$ of this clutch and intended to be applied against the side wall of casing $a$ when the clutch is engaged. On the other side of disc $b$, from this side wall, there is provided a disc $d$ rotating together with casing $a$ and which, when the clutch is not engaged, is held by springs $e$ at a distance from disc $b$.

The clutch is engaged under the effect of centrifugal masses $f$ pivotally supported about an axis $g$ by a support $h$. This support may be either coupled, under the action of a spring $i$, with casing $a$ or a part $a_1$ rigid therewith, so as to be thus driven in rotation, or braked, for instance by an electro-magnetic brake $j$ supported by the frame D of the transmission. For this purpose, support $h$ is mounted to rotate together with a plate $k$ slidable axially with respect to support $h$ and fitted with a lining $l$. Spring $i$ tends to apply this lining $l$ against element $a_1$, rotating together with casing $a$, while brake $j$, as it stops plate $k$, moves lining $l$ away axially from said element $a_1$.

Consequently, when the electro-magnetic brake is supplied with current, plate $k$ and the support $h$ of the centrifugal masses are stopped and casing $a$, together with disc $d$, rotates freely with respect to disc $b$ since masses $f$ are ineffective. On the contrary, if no current is flowing through the winding of brake $j$, spring $i$ applies lining $l$ against rotating element $a_1$, whereby support $h$ is driven in rotation. The centrifugal masses $f$ carried by this support pivot about their axis $g$ under the action of the centrifugal force and, through a disc $m$, a ball bearing $n$, another disc $o$, springs $p$, and disc $d$, they apply disc $b$ against the side wall of casing $a$, so as to wedge this disc between said side wall and disc $d$, whereby disc $b$ and driven shaft $c$ are thus coupled with the driving shaft.

The strength of springs $e$, which tend to keep disc $d$ at a distance from disc $b$ is to be chosen such that the centrifugal force which acts upon masses $f$ cannot compress said springs $e$ as long as the engine is running below idling speed. The clutch therefore remains disengaged even after the current has been cut off in the electromagnetic brake $j$ as long as the engine has not picked up to a speed above idling.

Clutch B is of the same construction and the same elements are designated by the same reference letters with an index "1."

The casing $a_1$ of clutch B is constantly coupled in rotation with the casing $a$ of clutch A, and the side wall of this casing $a_1$ simultaneously constitutes the element $a_1$ above referred to in the description of clutch A.

The lining $l_1$ of disk $k_1$ of clutch B is applied by spring $i_1$ against the wall $r_1$ of the casing $a_1$ of clutch B, to achieve the drive in rotation of support $h_1$, when clutch B is to be engaged. The operation of clutch B is therefore quite analogous to that of clutch A.

It is therefore possible, by engaging one or the other of clutches A and B, to couple either of driven shafts $c$ and $c_1$ with the driving shaft, or both may be driven simultaneously when both of the clutches are engaged.

According to my invention, the driven shaft $c$ of clutch $a$ is coupled with the planet wheel carrier plate 5 of sun and planet wheel gear C and the driven shaft $c_1$ of clutch B is coupled with the sun wheel 7 of this gear.

On plate 5, on either side thereof, are fixed, through bolts 8, half-cages 9 and 10 which carry three spindles 11 on which the planet wheels are rotatably mounted. Every planet wheel unit includes at least one pinion 14 in mesh with sun wheel 7 and one pinion 17 in mesh with another sun wheel 18 rigid with the output shaft 19 of the transmission. In order to obtain reverse gear and still another gear combination, every planet wheel unit further includes a pinion 12 in mesh with a central pinion or sun wheel 13 (for reverse gear) and a pinion 15 in mesh with a central pinion or sun wheel 16 (for said supplementary gear combination).

In order to be able to stop some of these sun wheels, plate 5 is coupled in rotation with the armature 20 of an electromagnet 24 carried by the frame D of the transmission, whereas sun wheel 7 and shaft $c_1$ are coupled in rotation with a plate 29 which carries the armature 22 of an electro-magnet 23 also rigid with frame D, and sun wheel 16 is coupled in rotation with the plate which carries the armature 21 of an electro-magnet 25 also rigid with frame D. Furthermore, sun wheel 13 is coupled in rotation with a plate 30.

Plate 30 includes a flange provided with a multiplicity of holes or notches $30_1$ intended to cooperate with a rod 32 slidably guided in frame D, to stop said plate 30. Sliding movement of rod 32 is obtained through a lever 33 actuated by a rod 35 manually operated by the vehicle driver.

As for plate 29, it can be stopped not only through the servo-motor constituted by electro-magnet 23 but also manually by the driver.

For this purpose, plate 29 is provided with a flange 28 provided with holes $28_1$ adapted to cooperate with a rod 31 slidably guided in frame D. This rod 31 also is connected with lever 33, which is T-shaped. Thus, when one of these rods 31 or 32 stops the corresponding plate (29 or 30 respectively), the other rod leaves its plate free to rotate. Furthermore, in neutral position, as shown by Fig. 1, both of these rods 31 and 32 are disengaged from the holes $28_1$ and $30_1$ of the corresponding plates.

For reasons which will be hereinafter explained, the support $h_1$ of the centrifugal masses $f_1$ of clutch B can be stopped not only by means of electro-magnet $j_1$ but also mechanically by a device actuated by the driver. This device includes a sliding rod 42 guided in frame D and adapted to ccooperate with teeth 40 provided along the edge of plate $k_1$. Rod 42 is actuated through a bell crank lever 43 the operation of which will be hereinafter described. Anyway, the insertion of rod 42 between two adjacent teeth of plate $k_1$ prevents any rotation thereof and, consequently, any rotation of the support $h_1$ of centrifugal masses $f_1$.

The transmission above described makes it possible to obtain five different gears, including a reverse gear, first gear being obtainable through two different control devices. Gear control is achieved by means of a single control member (selector) having advantageously the form of a lever 39 operated by the driver and which may have, on the one hand, pivoting displacements toward the left or toward the right (see the arrows 63 and 64 of Fig. 2) and, on the other hand, translatory displacements parallel to its pivot axis (see arrow 65 on Fig. 3).

Owing to these displacements, lever 39 actuates sliding rods 31, 32 and 42 mechanically and operates electro-magnets $j$, $j_1$, 23, 24 and 25.

Figure 3:
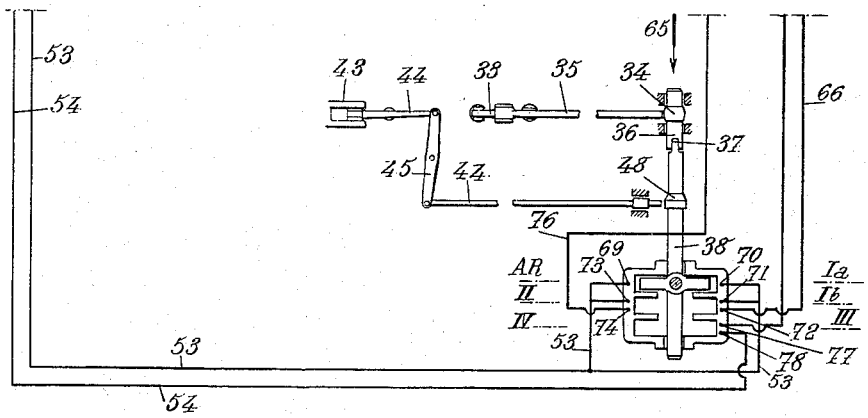

The sliding rods 31, 32, 42 can be operated by lever 39 only when this lever is located in plane AR—I$a$ (Fig. 3). In this position, the screw-driver shaped end 37 of the pivot spindle 38 of lever 39 engages a corresponding groove of another spindle 36 which carries a lever 34 to the end of which is hinged the above mentioned rod 35. When lever 39 is in the vertical position shown by Fig. 2, which position corresponds to neutral, both of the sliding rods 31 and 32 release plates 29 and 30, respectively. When lever 39 is pivoted toward the left, rod 32 engages one of the holes of plate 30, thus stopping sun wheel 13 (Fig. 6) whereas, when lever 39 is pivoted toward the right, rod 31 engages one of the holes of plate 29, thus stopping shaft $c_1$ and sun wheel 7 (Fig. 7), whereas plate 30 is released.

Furthermore, for all the positions of lever 39 in plane AR—I$a$, rod 42 is in mesh with the peripheral teeth 40 of the plate $k_1$ of clutch B, thus preventing any possibility of rotation of the support of the centrifugal masses and consequently mutual engagement of the parts of this clutch.

This is due to the fact that when said lever 39 is in this plane, a collar 48 rigid with spindle 38 pivots a lever 46 (Figs. 4 and 5) in the clockwise direction. This movement is transmitted to rod 42 through rods 44, lever 45 and bell crank lever 43, so as to engage rod 42 between two teeth 40 of plate $k_1$ (Fig. 4).

When lever 39, after being pivoted back into neutral position, is moved by translation in the direction of the arrow 65 of Fig. 2 away from plane AR—I$a$, the end 37 of its spindle 38 is withdrawn from the slot of spindle 36 whereby it ceases to be coupled with lever 34. Furthermore, collar 48 ceases to act on rod 44, whereby a spring 47 returns sliding rod 42 into the position for which it releases plate $k_1$ (Fig. 5).

When lever 39 is in one of the planes II—I$b$ or III—IV, it no longer acts mechanically on rods 31, 32 or 42 but controls contactors cooperating with the electrical terminals shown by Fig. 2.

For this purpose, lever 39 is provided with a contact strip 68 constantly connected, through conductors 67 and 51, and the engine ignition switch 41, with one of the terminals of the battery E of the vehicle.

This strip 68 cooperates, when lever 39 is pivoted, with contact elements designated, in Figs. 2, 6 and 7, by reference numerals 69, 70, 71, 72, 73, 74, 77 and 78, which are connected with the respective windings of the electro-magnetic brakes of the transmission.

Furthermore, in neutral position (see Fig. 2), lever 39 closes switches 55 and 56, thus causing electric current to be fed to both of the electro-magnetic brakes $j$ and $j_1$ of clutches A and B, which, consequently, are disengaged and enable the engine to run freely, even at a speed higher than idling speed.

As soon as lever 39 leaves its neutral position, switches 55 and 56 are opened.

Lever 39 is further provided with a switch 59 preferably operated by a knob located on the handle of this lever. This knob, when pushed down, closes, irrespective of the position of lever 39, the circuits which feed current to the windings of the electro-magnetic brakes $j$ and $j_1$ of clutches A and B. These circuits are, for brake $j$, battery E, conductors 51, 60, switch 59, conductors 61 and 54 and the winding of brake $j$, and, for brake $j_1$, battery E, conductors 51 and 60, switch 59, conductors 62 and 53 and the winding of brake $j_1$. The closing of these circuits has for its effect to disengage both of the clutches. Knob 59 is pushed down every time the driver is to shift from one gear to another.

The transmission above described works as follows:

a. Reverse gear

Lever 39, initially located in plane AR—I$a$, is moved angularly in the direction of arrow 63. Consequently, sun wheel 13 is stopped by rod 32. Clutch B is kept disengaged on the one hand by the fact that current is fed to the winding of electro-magnetic brake $j_1$ through the following circuit: battery E, switch 41, conductor 51, conductor 67, strip 68, contact 69 and conductor 53, and on the other hand by the fact that sliding bar 42 is brought into mesh with the teeth 40 of plate $k_1$. Clutch B would therefore be disengaged even in case of failure of electro-magnetic brake $j_1$ to work, due for instance to lack of current.

On the contrary, clutch A can be engaged by the action of the centrifugal force on masses $f$ as soon as the engine is running above idling speed. Reverse gear is thus obtained, shaft 1 driving, by clutch $a$—$d$, $b$, shaft $c$, plate 5, pinions 17 and 18 and the output shaft 19.

b. First gear

First gear is obtained for two different positions of lever 39. The first position I$a$ is that reached by lever 39 when it is moved in the direction of arrow 64 while remaining in the plane AR—I$a$. In this position, lever 39 stops on the one hand sun wheel 7 by means of rod 31 which engages into one of the holes $28_1$ of flange 28 and on the other hand the plate $k_1$ of clutch B by means of sliding bar 42. This plate is simultaneously stopped by electro-magnetic brake $j_1$ because the electric circuit of this brake is closed through strip 68 and contact element 70.

On the other hand, clutch A can be engaged centrifugally as soon as the engine speed exceeds idling speed. First gear is thus obtained, shaft 1 driving, by clutch $a$—$d$, $b$, shaft $c$, plate 5, pinions 17 and 18 and the output shaft 19.

The second position of lever 39 for producing this gear combination is that indicated at I$b$ (Fig. 2) and reached by sliding displacement in the direction of arrow 65 and rotation in the direction of arrow 64. In this position, strip 68 cooperates with both of the contacts 71 and 72. Consequently, the circuit of the electro-magnetic brake $j_1$ is closed through conductor 53 and the circuit of electro-magnet 23, which acts upon armature 22, carried by disc 29, is also closed, through conductor 66. Consequently, both the support of the centrifugal masses $f_1$ of clutch B and sun wheel 7 are stopped. The working of the transmission when lever 39 is in position I$b$ is therefore the same as when said lever is in position I$a$. However, the braking or stopping actions are achieved, when lever 39 is in position I$b$, exclusively through servo-motor means (electric current) whereas, in position I$a$, they are obtained mechanically or both mechanically and electrically.

c. Second gear

Lever 39, located in plane II—I$b$, is moved angularly in the direction of arrow 63 into position II, where strip 68 cooperates with contacts 73 and 74. Contact 73 thus closes the energizing circuit of brake $j_1$, whereby clutch B is out of action, and contact 74 causes, through conductor 76, electric brake 25 to stop the armature 21 carried by sun wheel 16. Clutch A being in engagement, shaft $c$ driving by plate 5, pinions 17 and 18 and the output shaft 19, second gear is obtained, exclusively through servo-motor means E, $j_1$, 25.

d. Third gear

To obtain this gear combination, lever 39 is first moved in the direction of arrow 65 into plane III—IV and then pivoted in the direction of arrow 64 into position III. Strip 68 then cooperates with strips 77 and 78. The closing of the circuit in which contact 77 is interposed causes, through conductor 75, electro-magnet 24 to be energized, which stops, through its action on armature 20, planet wheel carrier 5. On the other hand, contact 78 causes, through conductor 54, brake $j$ to be energized. Consequently, clutch A remains disengaged. On the contrary, clutch B is centrifugally brought into coupling position. Third gear drive is therefore obtained through clutch B and shaft $c_1$ driving through pinions 7, 14—17 and 18, the output shaft 19. This result is obtained exclusively through servo-motor means E, $j$, 24.

e. Fourth gear or direct drive

Lever 39, located in plane III—IV, is pivoted in the direction of arrow 63, into position IV. No electric circuit is closed by this lever in this position, whereby both of the clutches are brought into action and the sun and planet gear rotates as a whole. This operation is obtained without bringing any servo-motor forces into play.

It should also be noted that the transmission is in neutral when lever 39 is in the position shown by Figs. 2 and 3, the engine running freely even if, due to lack of current, brakes $j$ and $j_1$ are not closed through switches 55 and 56. This is due to the fact that, for this position of lever 39, the plate $k_1$ of clutch B is stopped by bar 42. If the engine is then accelerated, clutch A is engaged automatically but clutch B remains out of action. On the other hand, as none of the elements of the sun and planet gear is stopped, no torque is transmitted to the output shaft 19.

To start the vehicle, it then suffices to introduce, through lever 39, either of rods 31 and 32 into the holes of the corresponding plate 29 or 30, which can easily be done when the engine is idling (for which speed of the engine, clutch A is disengaged because the centrifugal action is insufficient to overcome the resistance of springs $e$).

The construction of Figs. 9 and 10 is, in a general way, similar to that above described, but each of the driven shafts $c$ and $c_1$ of clutches A and B is rigid with one of the sun wheels 79 (for shaft $c$) and 80 (for shaft $c_1$) of the sun and planet gear C. Furthermore, the planet wheel carrier 81 can be either stopped by a brake 82 or free to rotate when said brake is out of action. Each of the planet wheel units carried by planet wheel carrier 81 includes four toothed wheels 83, 84, 85, 86, coaxial and rigid with one another. Wheels 84 and 85 are constantly in mesh with sun wheels 80 and 79, while wheel 86 is constantly in mesh with a wheel 18 rigid with the output shaft 19 of the gear. Finally, wheel 83 is constantly in mesh with a central wheel 87 which may either be stopped or be left free to rotate, through the provision of means 30, $30_1$, 32, similar to those above described.

The driven shaft $c_1$ of clutch B and sun wheel 80 rigid therewith may be stopped, when clutch B is disengaged through any suitable means, for instance by means of a sliding rod 31 capable of engaging one of the holes $28_1$ of a plate 29 rigid with shaft $c_1$. Rods 31 and 32 are for instance operated as in the embodiment above described.

This transmission gear works as follows:

*First gear.*—Clutch A is disengaged. On the contrary, clutch B is brought into action as soon as the engine speed exceeds the idling speed. Simultaneously, plate 30 and sun wheel 87 are stopped by means of rod 32. The shaft $c_1$ drives then through the pinions 80, 84–86, 18 the output shaft 19.

*Reverse gear.*—Clutch A is centrifugally engaged, to drive shaft $c$, as soon as the speed exceeds idling speed, whereas clutch B is kept disengaged. Furthermore, plate 29, shaft $c_1$ and sun wheel 80 are stopped by means of rod 31. The shaft $c$ drives then through the pinions 79, 85–86, 18 the output shaft 19.

*Second gear.*—Clutch A is engaged, in order to ensure the drive of driven shaft $c$ from the driving shaft, whereas clutch B is kept disengaged. Planet wheel carrier 81 is stopped by brake 82. The shaft $c$ drives then through the pinions 79, 85–86, 18 the output shaft 19.

*Third gear.*—Clutch B can be engaged to drive shaft $c_1$, whereas clutch A is kept disengaged. The planet wheel carrier 81 is stopped by its brake 82, as in the case of second gear. The shaft $c_1$ drives then through the pinions 80, 84–86, 18 the output shaft 19.

*Direct drive.*—Both of the clutches A and B are engaged and the planet wheel carrier 81 is free to rotate.

It results from what precedes that, in order to shift from second to third gear and vice versa, only clutches A and B are acted upon, whereas no action is exerted upon the brake of the planet wheel carrier 81, which is kept stationary for both of these gear combinations. This makes it possible to simplify the control system.

Concerning the brakes that are used, they may be of any suitable type. Concerning first gear in particular, I may use, in addition to the purely mechanical brake 30–32, a brake operated by a servo-motor energy, for instance a hydraulic or magnetic brake as above described.

Concerning more particularly the brake 82 of the planet wheel carrier, it may be of the electro-magnetic type or, preferably, of the hydraulic type. Fig. 10 shows a construction of such a brake.

In this case, brake 82 is operated by means of a piston 88 which actuates two levers 89 and 90 connected together by gear teeth 91. Piston 88 is moved by a fluid under pressure, for instance oil placed under pressure by a pump 92 (driven for instance by the engine of the vehicle) and the feed of which to cylinder 93 is controlled by a slide valve 94.

In the position of this slide valve indicated by Fig. 10, the oil delivered by pump 92 cannot reach cylinder 93 but escapes at 95 past the relief valve constituted by ball 96 subjected to the action of spring 97. Piston 88 is therefore in the position shown by Fig. 10 and the brake is released.

If, on the contrary, when the lever 39 is brought into a position in which it pushes on a rod 99 connected through a reversing lever 100 and a rod 101 with the slide valve 94, thus moving said valve into the position shown in dotted lines, the oil delivered by pump 92 flows through conduit 98 into cylinder 93 and moves piston 88 in the direction which applies brake 82.

The transmission system according to my invention not only simplifies driving but also is highly reliable, while employing relative simple means.

The transmission gear according to my invention, although being more especially intended for automobile vehicles, is of course applicable to any machines requiring a variable speed transmission.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A transmission device which comprises, in combination, a driving shaft and an output shaft, a sun and planet wheel gear mounted to drive said output shaft and including at least three elements rotating about the central axis of said gear, said three elements consisting of two sun wheels and a planet wheel carrier, two centrifugal clutches capable of coupling said driving shaft with two of said three elements, respectively, each centrifugal clutch including a driving disc permanently coupled with said driving shaft, a driven disc coupled with one of said gear elements respectively, a rotatable support coaxial with said discs, centrifugal masses movably mounted on said support, means operative by said masses urged by the centrifugal force, for exerting an axial thrust on at least one of said discs to apply them frictionally against each other, a part rigid with said driving shaft, a plate fixed in rotation to said support and movable axially with respect thereto, resilient means for urging said plate against said part to cause said support to be driven in rotation by said part, and control means operative from a distance for preventing or permitting at will rotation of said support to disengage or engage said clutch respectively, and further two distinct means for keeping stationary one of said gear elements each coupled permanently with the driven disc of one of said clutches, said two distinct means being operable by distinct control means, said sun and planet wheel gear being arranged to give direct drive when both of said clutches are engaged.

2. A transmission device which comprises, in combination, a driving shaft and an output shaft, a sun and planet wheel gear mounted to drive said output shaft and including at least three elements rotating about the central axis of said gear, said three elements consisting of two sun wheels and a planet wheel carrier, two centrifugal clutches capable of coupling said driving shaft with two of said three elements, respectively, each centrifugal clutch including a driving disc permanently coupled with said driving shaft, a driven disc coupled with one of said gear elements respectively, a rotatable support coaxial with said discs, centrifugal masses movably mounted on said support, means operative by said masses urged by the centrifugal force, for exerting an axial thrust on at least one of said discs to apply them frictionally against each other, a part rigid with said driving shaft, a plate fixed in rotation to said support and movable axially with respect thereto, resilient means for urging said plate against said part to cause said support to be driven in rotation by said part, and control means operative from a distance for preventing or permitting at will rotation of said support to disengage or engage said clutch respectively, and further two distinct means for keeping stationary one of said gear elements each coupled permanently with the driven disc of one of said clutches, said two distinct means being operable one by a servo motor force and the other by the manual force of the driver, said sun and planet wheel gear being arranged to give direct drive when both of said clutches are engaged.

3. A transmission device which comprises, in combination, a driving shaft and an output shaft, a sun and planet wheel gear including four sun wheels juxtaposed along the same axis, at least two sets of planet wheels including each four planet wheels in mesh with said four sun wheels respectively, the planet wheels of each set being rigid with one another, and a planet wheel carrier coaxial with said four sun wheels and on which said sets of planet wheels are journalled, one of said sun wheels being coupled with said output shaft, means for holding another of said sun wheels stationary at will, a centrifugal clutch having a driving disc permanently coupled with said driving shaft and a driven disc permanently coupled with another of said sun wheels, another centrifugal clutch having a driving disc permanently coupled with said driving shaft and a driven disc permanently coupled with said planet wheel carrier, each of said centrifugal clutches including a rotatable support coaxial with the discs thereof, centrifugal masses movably mounted on said support, means operative by said masses urged by the centrifugal force for exerting an axial thrust on at least one of said discs to apply them frictionally against each other, a part rigid with said driving shaft, a plate fixed in rotation to said support and movable axially with respect thereto, resilient means for urging said plate against said part to cause said support to be driven in rotation by said part, and control means operative from a distance for preventing or permitting at will rotation of said support to disengage or engage said clutch respectively, means for preventing rotation of the driven disc of the first mentioned clutch, means for preventing rotation of said planet wheel carrier and means for preventing rotation of the fourth sun wheel.

4. A transmission device which comprises, in combination, a driving shaft and an output shaft, a sun and planet wheel gear including four sun wheels juxtaposed along the same axis, at least two sets of planet wheels including each four planet wheels in mesh with said four sun wheels respectively, the planet wheels of each set being rigid with one another, and a planet wheel carrier coaxial with said four sun wheels and on which said sets of planet wheels are journalled, one of said sun wheels being coupled with said output shaft, means for preventing rotation of another of said sun wheels, a centrifugal clutch having a driving disc permanently coupled with said driving shaft and a driven disc permanently coupled with another of said sun wheels, another centrifugal clutch having a driving disc permanently coupled with said driving shaft and a driven disc permanently coupled with said planet wheel carrier, each of said centrifugal clutches including a rotatable support coaxial with the discs thereof, centrifugal masses movably mounted on said support, means operative by said masses urged by the centrifugal force for exerting an axial thrust on at least one of said discs to apply them frictionally against each other, a part rigid with said driving shaft, a plate fixed in rotation to said support and movable axially with respect thereto, resilient means for urging said plate against said part to cause said support to be driven in rotation by said part, and control means operative from a distance for preventing or permitting at will rotation of said support to disengage or engage said clutch respectively, means for preventing rotation of the driven disc of the first mentioned clutch, means for preventing rotation of said planet wheel carrier, means for preventing rotation of the fourth sun wheel, a single control member and means for simultaneously connecting said control member with predetermined combinations of said clutch control means and said rotation preventing means to obtain various gear combinations.

5. A transmission device according to claim 4 further including distinct and supplementary means for preventing torque transmission by said first mentioned clutch, distinct and supplementary means for preventing rotation of the driven disc of this clutch and distinct and supplementary means for preventing rotation of the second mentioned sun wheel, the two last mentioned means being interconnected to operate alternately.

References Cited in the file of this patent

UNITED STATES PATENTS

| | | |
|---|---|---|
| 672,779 | Jones | Apr. 23, 1901 |
| 1,991,124 | Sharpe | Feb. 12, 1935 |
| 2,045,611 | Padgett | June 30, 1936 |
| 2,045,612 | Padgett | June 30, 1936 |
| 2,084,522 | Cotal | June 22, 1937 |
| 2,150,950 | Thoma | Mar. 21, 1939 |
| 2,167,873 | Burtnett | Aug. 1, 1939 |
| 2,171,534 | Banker | Sept. 5, 1939 |
| 2,193,317 | Flogaus et al. | Mar. 12, 1940 |
| 2,194,954 | Ravigneaux | Mar. 26, 1940 |
| 2,241,334 | Stucatur | May 6, 1941 |
| 2,259,729 | Burtnett | Oct. 21, 1941 |
| 2,447,007 | Gravina et al. | Aug. 17, 1948 |
| 2,559,765 | Gravina et al. | July 10, 1951 |

FOREIGN PATENTS

| | | |
|---|---|---|
| 491,459 | France | June 4, 1919 |
| 972,764 | France | Sept. 6, 1950 |